C. J. OLSON.
PNEUMATICALLY OPERATED CHAIN SAW.
APPLICATION FILED JAN. 7, 1913. RENEWED AUG. 17, 1917.

1,260,701.  Patented Mar. 26, 1918.

Inventor
C. J. Olson,

By
*[signature]*, Attorneys

UNITED STATES PATENT OFFICE.

CHARLES J. OLSON, OF MUSKEGON, MICHIGAN.

PNEUMATICALLY-OPERATED CHAIN SAW.

1,260,701.
Specification of Letters Patent.
Patented Mar. 26, 1918.

Application filed January 7, 1913, Serial No. 740,695. Renewed August 17, 1917. Serial No. 186,827.

*To all whom it may concern:*

Be it known that I, CHARLES J. OLSON, citizen of the United States, residing at Muskegon, in the county of Muskegon and State of Michigan, have invented certain new and useful Improvements in Pneumatically-Operated Chain Saws, of which the following is a specification.

This invention relates to pneumatically operated chain saws and is designed more particularly as an improvement on the chain saw forming the subject matter of my copending application Serial No. 700,264, filed May 28, 1912.

It is the aim of the present invention to provide in a device of the class described a novel arrangement of the motors for driving the chain saw both as regards relation of the motors to the saw and the relative positions of the motors and the handle which is grasped in supporting the device, the arrangement being such as to secure a balanced structure and thereby prevent overturning of the device while in use.

In the accompanying drawings.

Corresponding and like parts are referred to in the following description and indicated in all the views of the accompanying drawings by the same reference characters.

Figure 1:
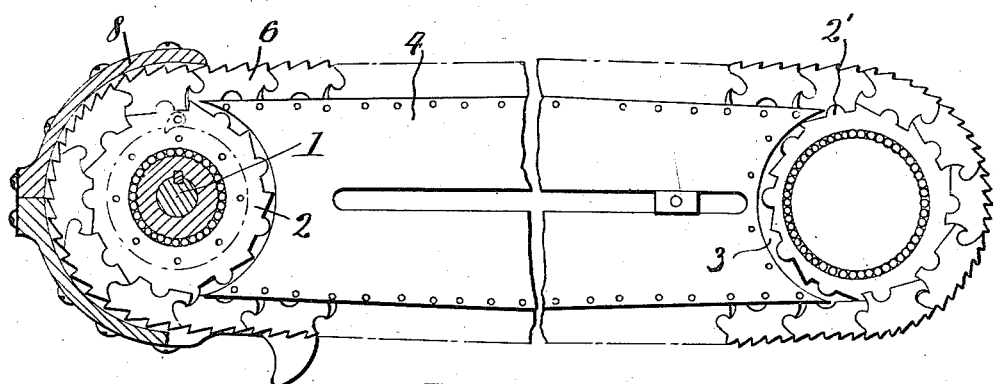
Figure 1 is a view partly in side elevation and partly in vertical section of the improved device, portions being removed to better illustrate the structure.

In the drawings the power shaft of the saw or, more generally speaking, the motor shaft, is indicated by the reference numeral 1 and as will be presently made apparent supports the drive sprocket of the saw and the compressed air motors which operate to rotate the shaft. The sprocket mentioned is identical in construction with that shown in my aforesaid copending application and is indicated in general by the numeral 2, this sprocket being located between the two motors which are indicated in general one by the reference character A and the other by the reference character B.

Figure 2:
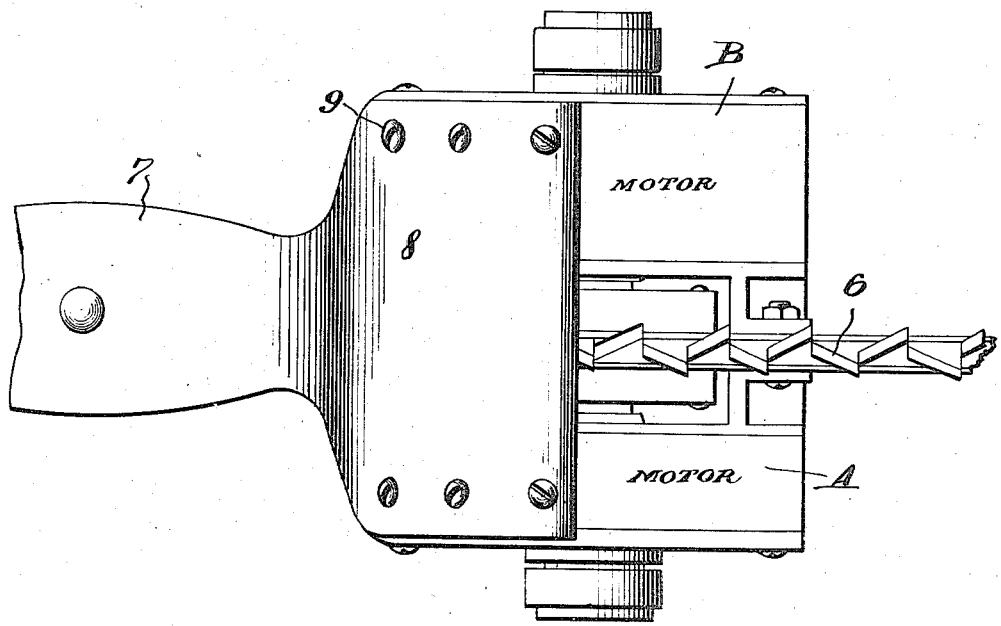
Fig. 2 is a top plan view of the handle end of the device.

The stock of the saw is supported at one end between the casings of the compressed air motors in the manner shown in Fig. 2 of the drawings and this stock consists of a plate 3 and cheek plates 4 which are riveted or otherwise secured upon opposite faces of the plate 3. The chain saw proper consisting of connected links 6 which are of the same construction as shown in the copending case, is trained over the sprocket 2 and another sprocket 2' located at the forward end of the stock.

The handle of the saw is indicated in general by the reference numeral 7 and is provided with a relatively wide head 8 the forward side of which is concave and arranged for the disposal thereagainst of the motor casings A and B, these casings being held securely against the forward side of the head 8 by means of screws 9 as shown in Fig. 2 of the drawings. The motors A and B may be of any ordinary compressed air type or may be operated by any other motive power and as they themselves constitute no part of the present invention it is not considered necessary to specifically illustrate or describe their structure. By reference to Fig. 2 of the drawings it will be observed that the motor casings are located at opposite sides of the stock upon which the chain saw is mounted for travel and that the said stock is located substantially in a plane in front to rear alinement with the axis of the handle 7 and that by reason of this relative arrangement of the parts a well balanced structure is produced and there is no likelihood of the device overturning while in use. Furthermore, it will be observed that the motor casings are firmly secured and snugly received within the concavity of the head 8 of the handle and that the said head serves as a hand shield at the rear end of the saw proper.

Having thus described the invention what is claimed as new is:—

1. In a chain saw machine, a handle, a relatively broad head carried thereby and having a concave forward side, spaced motors having their casings disposed within the concavity of the head and secured to and supported by the said head, a stock supported at one end between the said motor casings and extending forwardly substantially in alinement with the axis of the handle, a shaft extending between and common to the said motors, and a chain saw mounted for travel upon the stock and geared with the said shaft.

2. In a chain saw machine, a handle, a relatively broad head carried thereby and having a concave forward side, spaced motors having their casings disposed within the concavity of the head and secured to and supported by the said head, the adjacent heads of the motor casings having bracket portions, a stock secured between and supported by the said bracket portions, and a chain saw mounted for travel upon the stock and driven by the said motors, the stock extending substantially in alinement with the handle and the said head of the handle constituting also a guard for the chain saw lying in front of the grip of the handle.

In testimony whereof I affix my signature in presence of two witnesses.

CHARLES J. OLSON. [L. S.]

Witnesses:
LEO CUDDAHY,
FRANK E. HATHAWAY.